(12) United States Patent
Hsiao et al.

(10) Patent No.: US 10,466,080 B2
(45) Date of Patent: Nov. 5, 2019

(54) LOCKABLE CASING FOR VEHICLE DETECTION DEVICE

(71) Applicant: NANNING FUGUI PRECISION INDUSTRIAL CO., LTD., Nanning (CN)

(72) Inventors: Shun-Hsin Hsiao, New Taipei (TW); Hsien-Huan Chiu, New Taipei (TW); Wu-Jen Lo, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/407,492

(22) Filed: May 9, 2019

(65) Prior Publication Data

US 2019/0265085 A1    Aug. 29, 2019

Related U.S. Application Data

(62) Division of application No. 15/382,721, filed on Dec. 18, 2016.

(51) Int. Cl.
*G01D 11/24* (2006.01)
*G01D 3/08* (2006.01)

(52) U.S. Cl.
CPC ............. *G01D 11/245* (2013.01); *G01D 3/08* (2013.01)

(58) Field of Classification Search
CPC ................................ G01D 11/245; G01D 3/08
USPC ....................................................... 73/862.621
See application file for complete search history.

(56) References Cited

U.S. PATENT DOCUMENTS

| 7,718,951 | B2 * | 5/2010 | Scharrer | G01D 5/34707 250/231.13 |
| 2015/0185188 | A1 * | 7/2015 | Eidel | G01S 15/931 73/617 |

* cited by examiner

*Primary Examiner* — Octavia Hollington
(74) *Attorney, Agent, or Firm* — ScienBiziP, P.C.

(57) ABSTRACT

A vehicle detection device with thief-proof features includes a detector configured to detect a car above and a case configured to receive the detector. The detector is provided with a plurality of latches, and the case defines a plurality of channels. Each channel includes an embedded path and an encoding path adjacent to the embedded path. The embedded path guides one of the plurality of latches of the detector inserted into one of the plurality of channels, and the encoding path guides the latch to move through the channel to slidably install the detector into the case.

6 Claims, 8 Drawing Sheets

LOCKABLE CASING FOR VEHICLE DETECTION DEVICE

CROSS-REFERENCE TO RELATED APPLICATIONS

The application is a divisional application of U.S. Ser. No. 15/382,721, filed Dec. 18, 2016.

FIELD

The subject matter herein generally relates to detection devices, and more particularly to a vehicle detection device.

BACKGROUND

Parking spaces are generally equipped with a vehicle detection device. When a vehicle is in the parking space, the vehicle detection device can send a signal to a host, the host then sends all parking conditions to the driver to provide real-time parking information. However, the present vehicle detection device has no anti-theft structure, so that the vehicle detection device can be easily stolen while in use.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
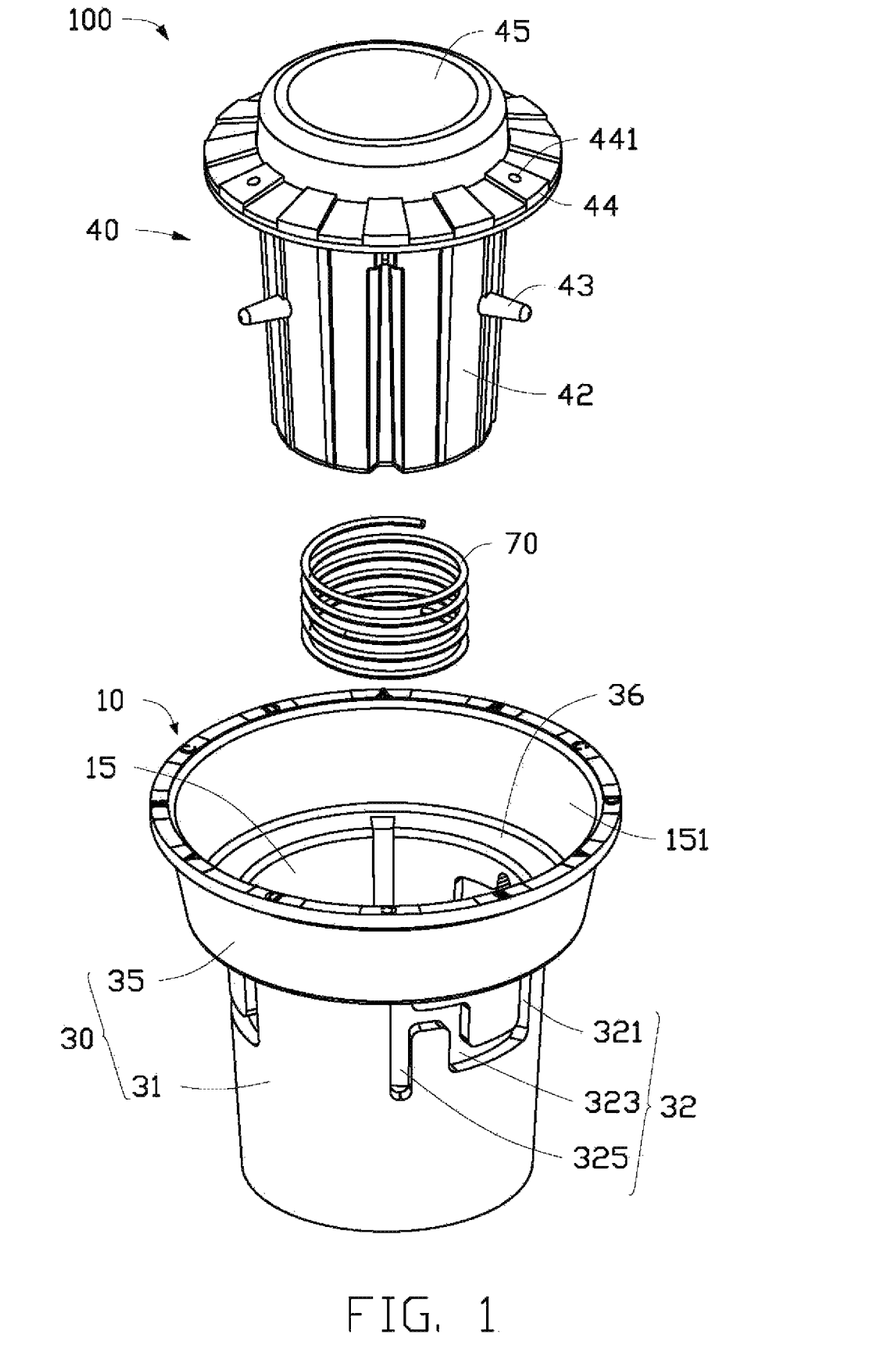
FIG. 1 is an exploded, isometric view of an exemplary embodiment of a vehicle detection device.

FIG. 1 illustrates one exemplary embodiment of a vehicle detection device 100 which includes a case 10, a detector 40 received in the case 10, and a resilient member 70. The vehicle detection device 100 is configured to be positioned on a parking space to detect whether there is a vehicle in the parking space.

Figure 2:
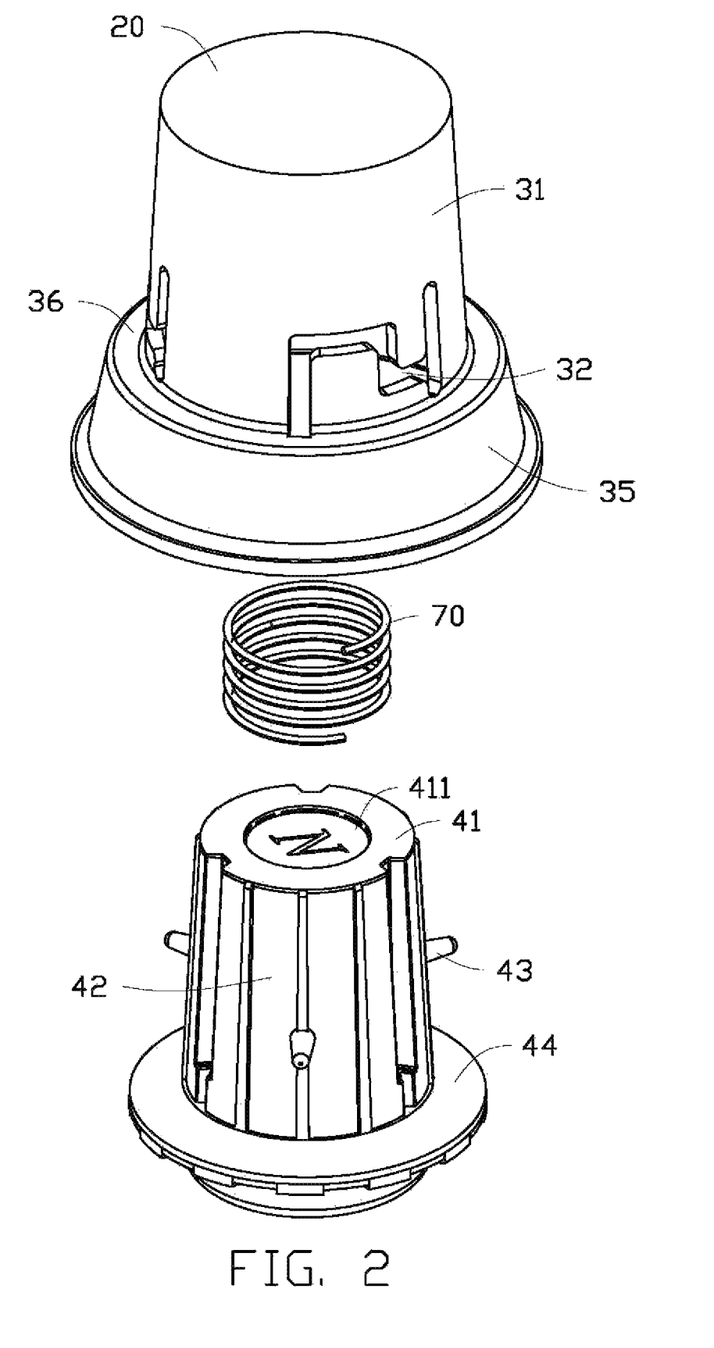
FIG. 2 is an alternate view of FIG. 1.

FIGS. 1 and 2 illustrate that the case 10 includes a base 20 and a loop wall 30 surrounding the edge of the base 20. The base 20 and the loop wall 30 can deform to form a receiving space 15, and an opening 151 is deformed at the top end of the receiving space 15. The detector 40 is configured to pass through the opening 151 to be received in the receiving space 15. The loop wall 30 includes a receiving portion 31 and an expansion portion 35 extending from the top end of the receiving portion 31. A connecting plate 36 is connected between the receiving portion 31 and the expansion portion 35.

The receiving portion 31 is provided with a plurality of channels 32. The channel 32 includes an embedded path 321, an encoding path 323, and an action path 325. One end of the embedded path 321 is located at the edge of the top end of the receiving portion 31 adjacent to the connecting plate 36, the other end of the embedded path 321 is adjacent to the encoding path 323. The encoding path 323 is adjacent to the embedded path 321 and the action path 325. The encoding path 323 can be set according to a preset path, and its shape on the case 10 can be arbitrarily set. The action path 325 is formed substantially in a vertical direction along the case 10. The action path 325 is configured to provide a space for motion in the direction of movement of the detector 40 during any movement.

The detector 40 includes a bottom wall 41 and a sidewall 42 surrounding the edge of the bottom wall 41. The sidewall 42 is provided with a plurality of latches 43 corresponding to the channels 32. Each latch 43 is configured to be inserted into the corresponding channel 32 and slid along the channel 32. The top end of the detection 40 is provided with a pressing plate 44, and the pressing plate 44 is configured to abut against the connecting plate 36. The pressing plate 44 defines a plurality of through holes 441 corresponding to the latches 43. A cover 45 is secured on the pressing plate 44. When the vehicle passes over the device 100, the cover 45 is squeezed. The electronic components (not shown) within the detector 40 will detect the vehicle and signal accordingly. The detector 40 further includes a clamp (not shown) configured to pass through the through hole 441 to abut against the latch 43.

The resilient member 70 is elastically deformable, and the ends of the resilient member 70 connect with the base 20 and with the bottom wall 41 to elastically support the detector 40.

Figure 3:
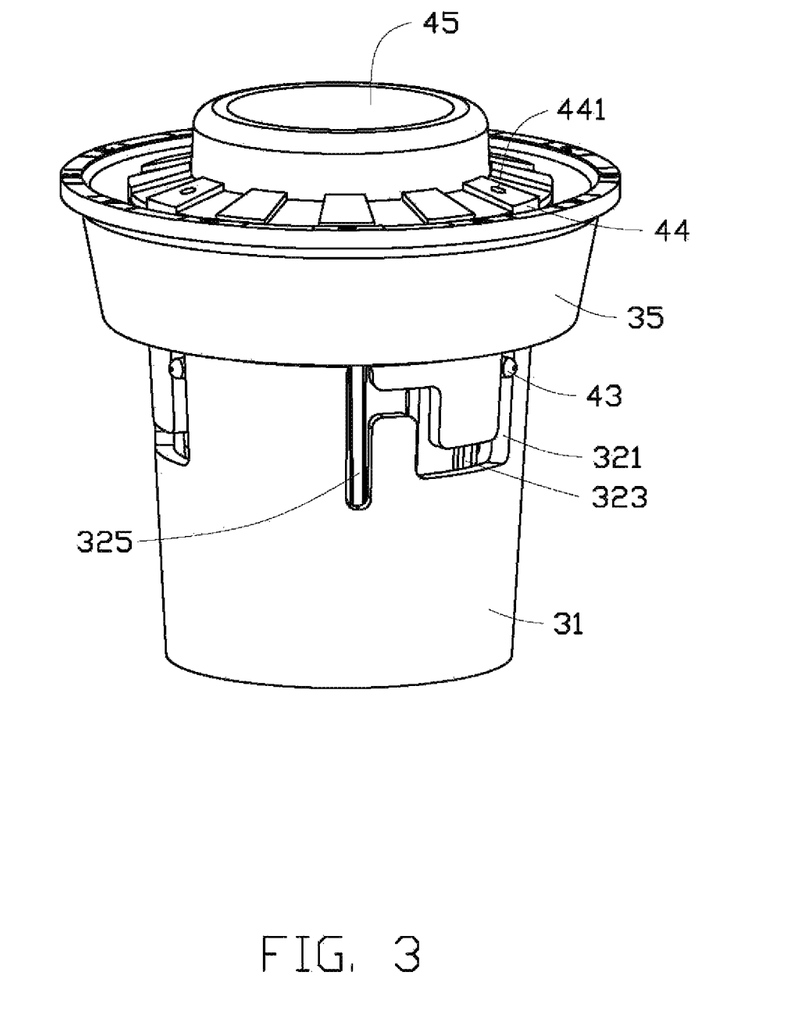
FIG. 3 is an assembled, isometric first view of the vehicle detection device of FIG. 1.
Figure 4:
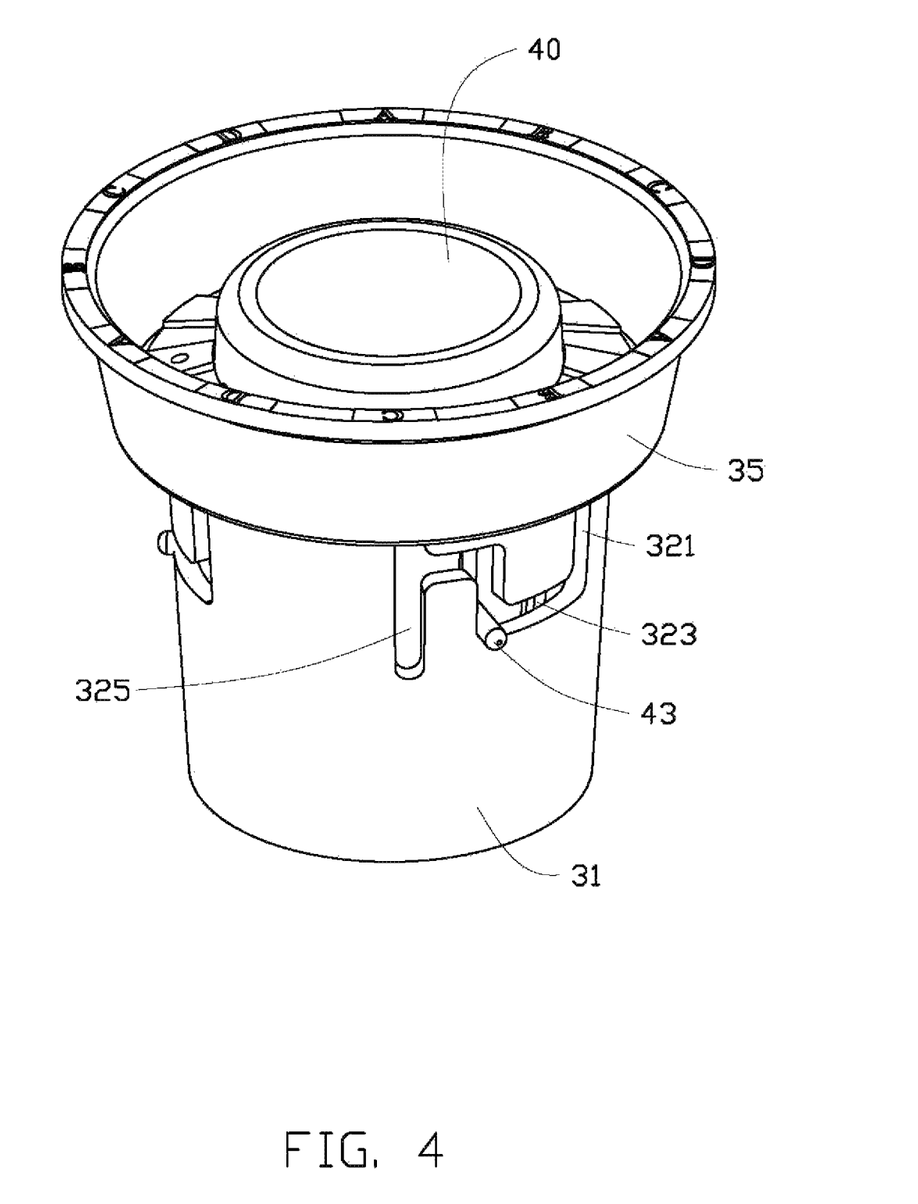
FIG. 4 is an assembled, isometric second view of the vehicle detection device of FIG. 1.
Figure 5:
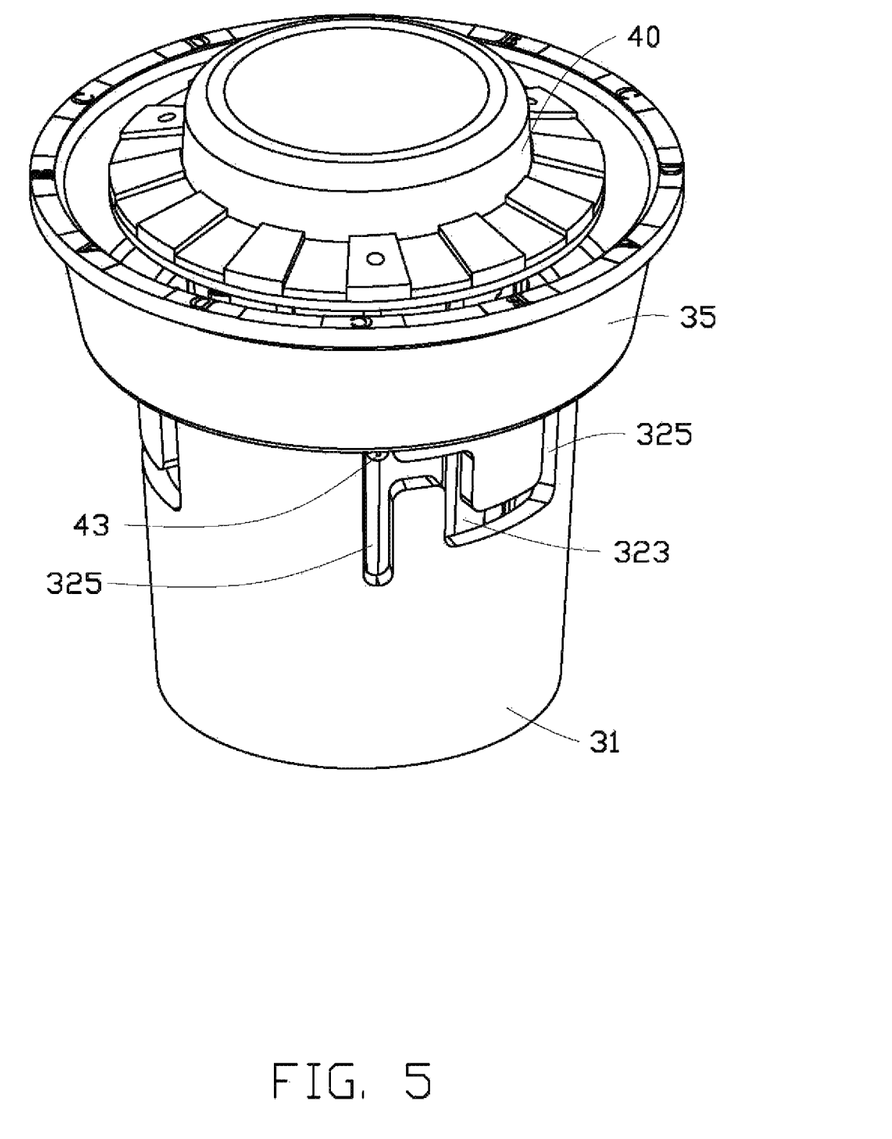
FIG. 5 is an assembled, isometric third view of the vehicle detection device of FIG. 1.

FIGS. 3 to 5 illustrate assembly, when the resilient member 70 is positioned in the receiving space 15, and one end of the resilient member 70 is abutted against the base 20. Then, the detector 40 passes through the opening 151 to be received in the receiving space 15. The bottom wall 41 is abutted against the other end of the resilient member 70, and the resilient member 70 is elastically constricted to support the detector 40. The latches 43 pass through the connecting plate 36 to be inserted into the embedded path 321. The latches 43 are moved to follow the encoding path 323, passing through the encoding path 323, and being received in the intersection of the encoding path 323 and the action path 325. The expansion portion 35 surrounds the pressing plate 44 and cover 45. The resilient member 70 supports the detector 40 so that the cover 45 is substantially flush with the top end of the expansion portion 35. Thus, the vehicle detection device 100 is assembled.

Figure 6:
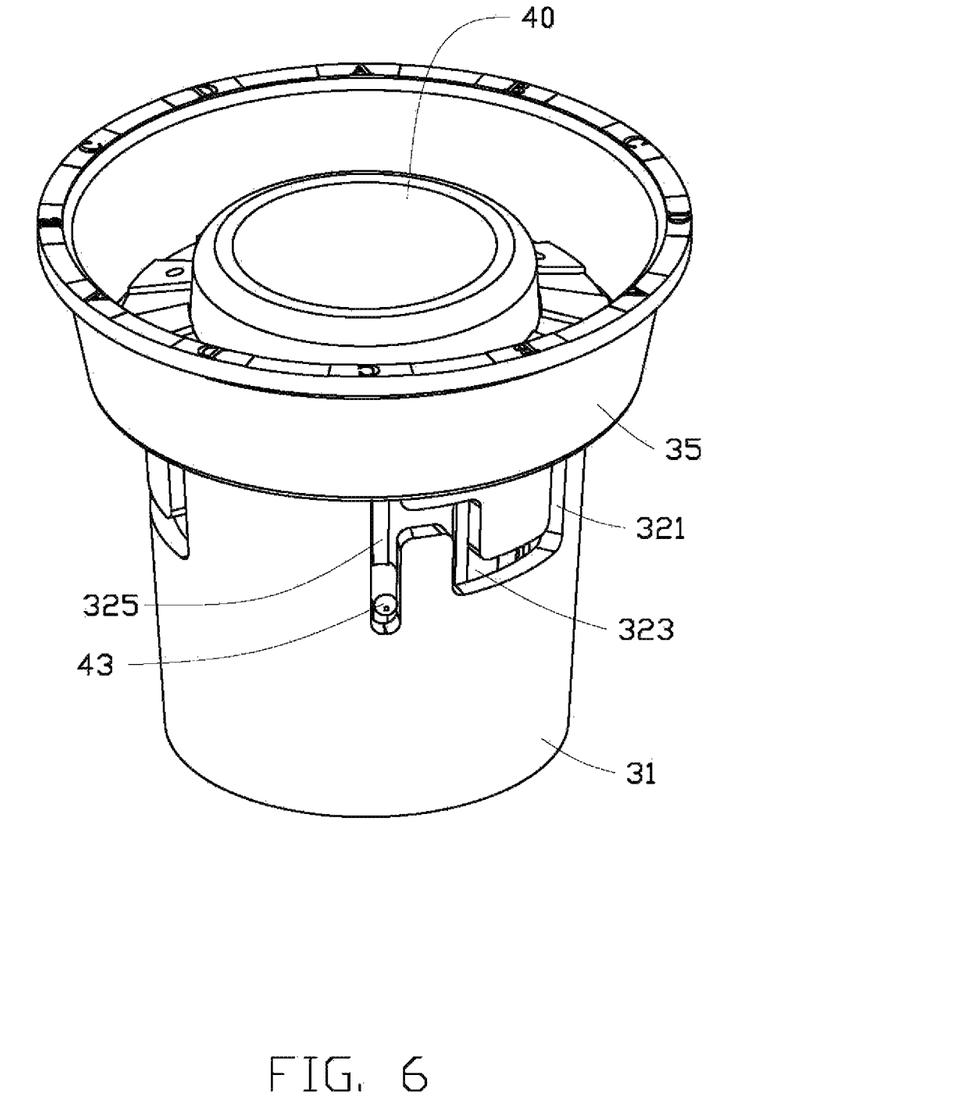
FIG. 6 is the vehicle detection device of FIG. 1 in a working state.

FIGS. 5 and 6 illustrate an exemplary use of the vehicle detection device 100. The case 10 is positioned on the ground, the bottom end of the case 10 being inserted into the ground, and the top end of the expansion portion 35 and the cover 45 are substantially flush with the ground. When the vehicle passes over the vehicle detection device 100, the vehicle presses the cover 45, and the detector 40 is pressed to move the latch 43 downwardly along the action path 325. The resilient member 70 is further elastically constricted. The electronic components within the detector 40 then broadcast signals to the outside.

When the detector 40 needs to be removed, the clamp is passed through the through hole 441 and pressed against the latch 43. The latch 43 moves towards the encoding path 323, passes along the encoding path 323, and moves into the embedded path 321. The latch 43 is then slid upwardly along the embedded path 321 to remove the detector 40 from the case 10.

Figure 7:
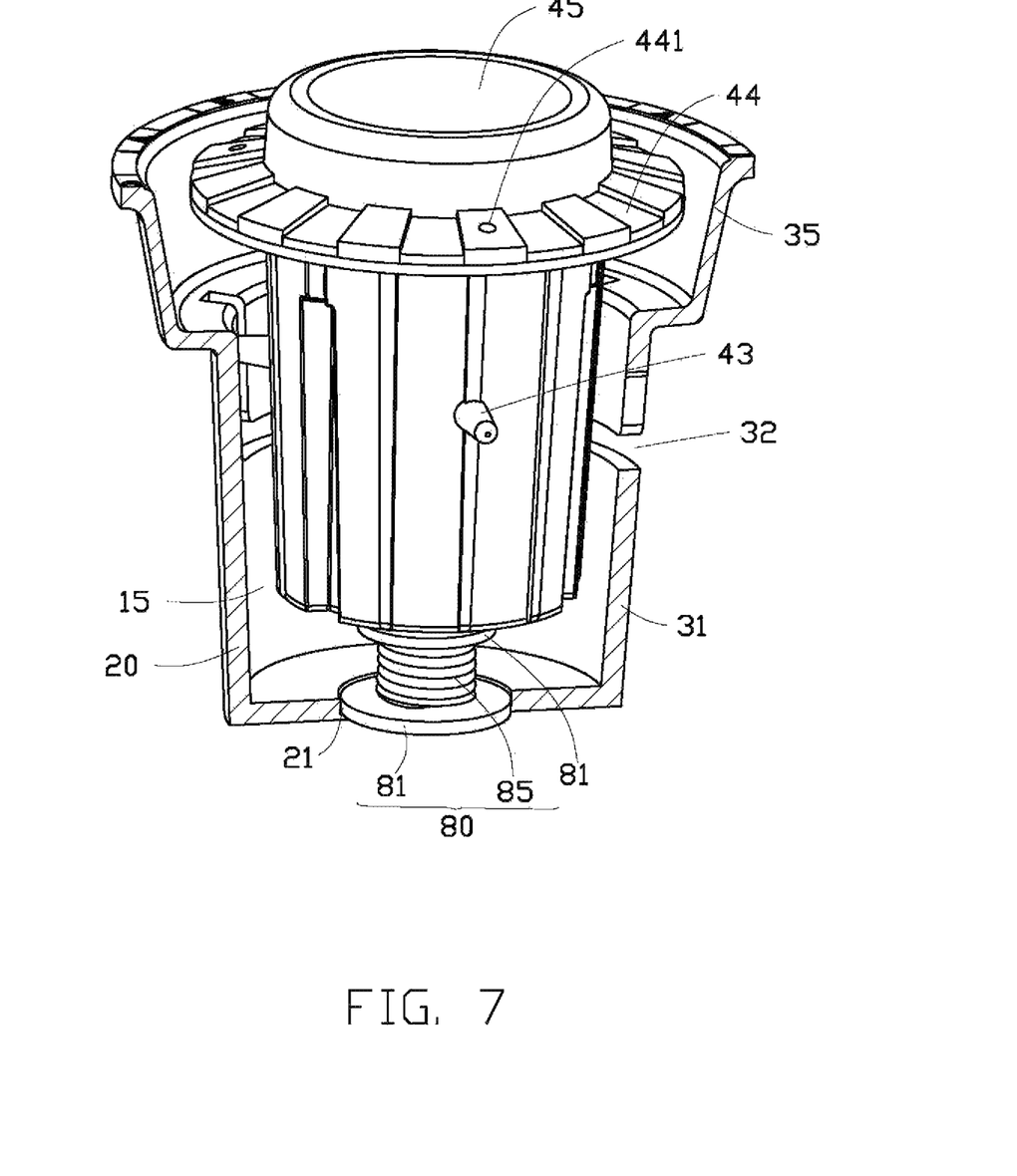
FIG. 7 is an assembled, isometric view of another exemplary embodiment of a vehicle detection device.
Figure 8:
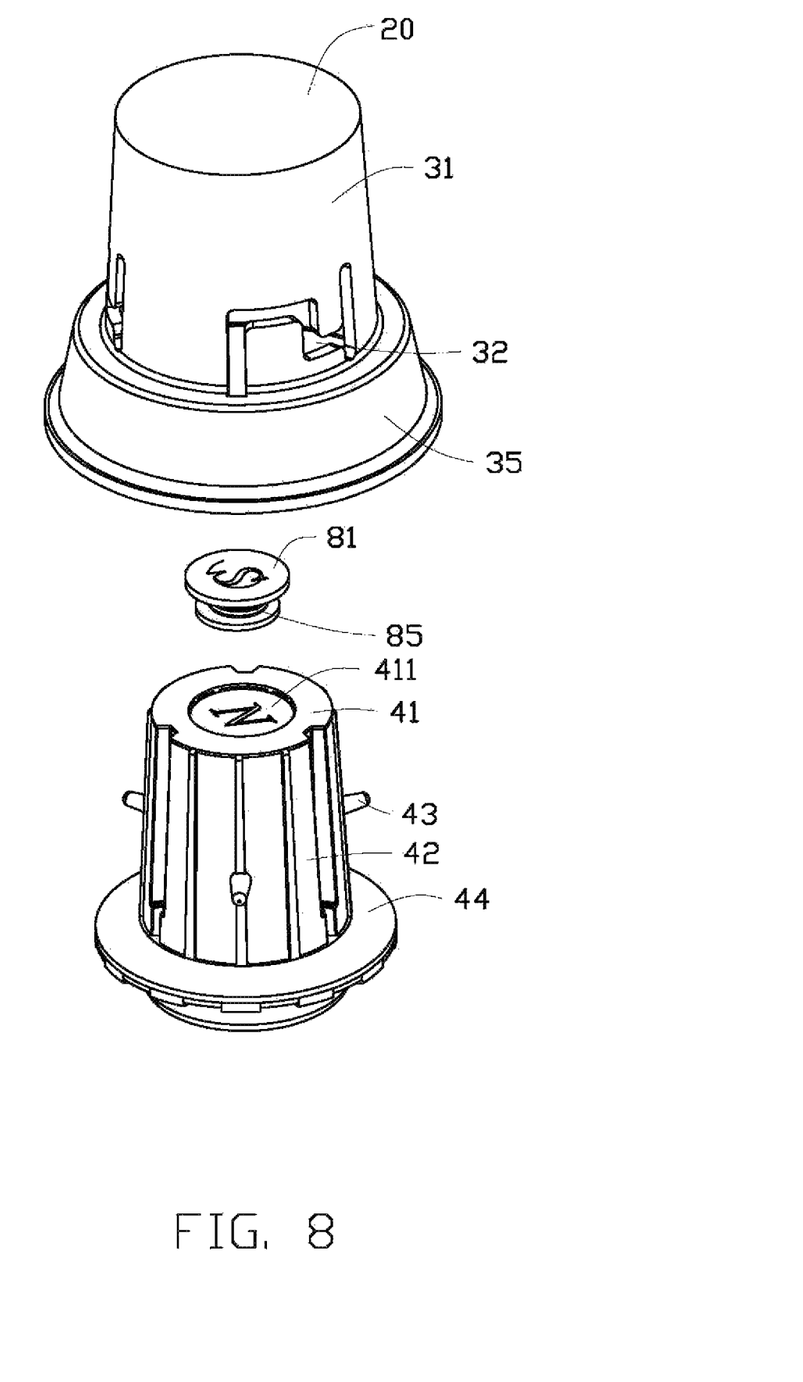
FIG. 8 is an exploded, isometric view of the vehicle detection device of FIG. 7.

FIGS. 7 and 8 illustrate another exemplary embodiment of the vehicle detection device 100. The base 20 is provided with a positioning groove 21 towards the receiving space 15. A receiving recess 411 corresponding to the positioning groove 21 is provided on an inner perimeter of the bottom wall 41. The vehicle detection device 100 includes a resilient module 80 received in the case 10, and the resilient module 80 includes two magnetic blocks 81. A connecting member 85 is positioned between the two magnetic blocks 85.

In assembly, one of the magnetic pieces 81 is positioned in the positioning groove 21 of the base 20, and the other magnetic piece 81 is positioned in the receiving recess 411 of the bottom wall 41. The detector 40 is positioned in the case 10. The ends of the connecting member 85 abut against the two magnetic blocks 81, and the magnetic blocks 81 present the same poles. Thus, the two magnetic blocks 81 are mutually repelled and the connecting member 85 is elastically deformed so as to elastically support the detector 40.

The exemplary embodiments shown and described above are only examples. Many details are often found in the art such as the other features of a vehicle detection device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A case configured to receive a detector, comprising:
a plurality of latches;
a plurality of channels, and each channel comprising;
an embedded path;
an encoding path adjacent to the embedded path;
wherein the embedded path guides one of the plurality of latches of the detector inserted into one of the plurality of channels, and the encoding path guides the latch to move through the channel to slidably install the detector into the case.

2. The case of claim 1, wherein the embedded path of the channel further comprises one end adjacent to the encoding path, wherein the latch is configured to be inserted into or removed from the channel through the one end of the embedded path.

3. The case of claim 2, wherein the channel further comprises an action path, and one end of the action path is adjacent to the encoding path, the action path is provided with a motion space in the direction of movement of the detector during movement.

4. The case of claim 1, wherein the case comprises a loop wall, the loop wall comprises a receiving portion, and the channel is defined in the receiving portion.

5. The case of claim 4, wherein the loop wall further comprises an expansion portion extending from a top end of the receiving portion, and the expansion portion is connected to the receiving portion through a connecting plate.

6. The case of claim 5, wherein one end of the channel is located at the edge of the top end of the receiving portion and cuts through the connecting plate.

\* \* \* \* \*